455-611 AU 233 EX
FIP8106 OR 3,426,207
Examine

INVENTORS
DAVID L. FRIED
WENDELL S. READ
BY Richard D. Seibel
ATTORNEY

INVENTORS
DAVID L. FRIED
WENDELL S. READ
BY Richard D. Seibel
ATTORNEY 3,426,207

FOCUSED OPTICAL HETERODYNE SYSTEM

David L. Fried, Woodland Hills, and Wendell S. Read, Los Angeles, Calif., assignors to North American Rockwell Corporation Filed June 17, 1964, Ser. No. 375,907
U.S. Cl. 250—199 22 Claims
Int. Cl. H04b 9/00

This invention relates to demodulation of information carrying light beams.

A convenient method of detecting and demodulating coherent light involves the use of a coherent light source as a local oscillator to provide a steady signal to mix with an incoming modulated signal. The mixed or superimposed signals are detected with a photodetector. There are at present no available detectors which can respond at optical frequencies, therefore the detector responds at the beat frequency of the two light beams to provide a heterodyne signal.

If the information carrying signal is phase or frequency modulated rather than amplitude modulated, heterodyne detection is the only way the signal can be analyzed. With any type of modulation the local oscillator effectively amplifies the incoming signal thereby reducing or completely eliminating the effect of a noisy background. The signal to noise ratio of an amplitude modulated, shot noise limited, signal is increased by the square root of two over the signal to noise ratio of an intensity detection system. A difficulty with a conventional heterodyne detection system is the critical angular alignment which must be obtained between the local oscillator light beam and the information carrying signal light beam. The deviation from alignment must be such that there is a phase difference across the wave front that does not exceed a fraction of a wave length, that is, the phase difference across the face of the detector must be small compared with the wave length of the light. Although good optical alignment can be obtained in a laboratory arrangement under controlled conditions, the necessary accurate alignment is difficult for moving signal sources or for long range detection which may have tracking errors. Additionally some difficulty is noticed due to aberrations introduced by the atmosphere which cause the information carrying signal beam to have a non-uniform wave front.

It is therefore a broad object of this invention to provide a means for heterodyne detection which is relatively insensitive to angular position.

Thus in the practice of this invention according to a preferred embodiment there is provided a means for sharply focusing an information carrying light beam into an Airy disk. Additionally there is provided a means for superimposing a collimated light beam from a local oscillator on the Airy disk and the surrounding focal plane. A photodetector having a movable effective detector area is provided at the focal plane. In a preferred embodiment the Airy disk is projected on the detecting surface of an image dissector tube so that the Airy disk can be detected without detection of large areas of surrounding background. It is found with such an arrangement that good signal to noise ratio is obtained and a large deviation in angular alignment is acceptable without loss in signal to noise ratio.

Thus it is a broad object of this invention to provide an improved means for heterodyne detection of light.

It is another object of this invention to provide a means for demodulating an information carrying light beam.

It is a further object of this invention to provide an information transmitting system.

Other objects and many of the attendant advantages of this invention will be readily appreciated as the same becomes better understood by reference to the following detailed description when considered in connection with the acompanying drawings wherein.

Throughout the figures like reference numerals refer to like parts.

Figure 1:
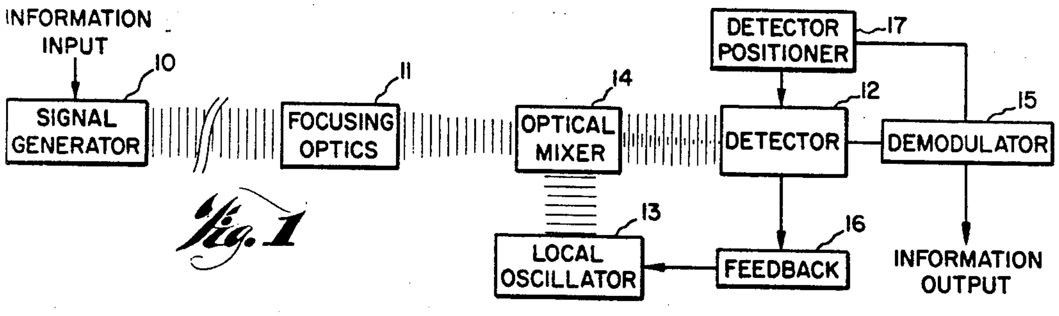
FIG. 1 illustrates a block diagram of a system embodying the principles of this invention.

A reason for using heterodyne detection of light is that, if the local oscillator is strong enough, the noise generated by the local oscillator dominates all other noise. That is, the local oscillator noise is so very much greater than any background noise, detector thermal noise or the like that it is as if these noise sources did not exist. The signal to noise ratio obtained at the detector output, therefore, substantially matches the theoretically obtainable value.

For the purposes of analysis an optical wave is considered as defined by its oscillating electric vector $E(x, y, t)$ where $(x, y)$ are the coordinates of the plane on which the wave is being evaluated, and $t$ represents the time dependence. The quantum efficiency of a photodetector is defined as $\eta$ where $\eta$ is a conversion between the quantity $E^2dxdy$ and current $di$. Consider first a heterodyning accomplished by parallel orientation of two plane waves, i.e. parallel light beams, $E_s(x, y, t)$ the signal wave, and $E_{LO}(x, y, t)$ the local oscillator wave. The two plane waves have the same finite extent, covering an area A. The signal produced by a detector covering this area is $$i(t)=\eta\iint_A dxdy\{E_s(x, y, t)+E_{LO}(x, y, t)\}^2$$

If $E_s$ and $E_{LO}$ oscillate at slightly different frequencies $\omega_s$ and $\omega_{LO}$, with a frequency difference of $\Delta\omega$, and if the wave fronts are perfectly plane so that there is no dependence on $(x, y)$, then $$E_s(x, y, t)=E_s^\circ \sin (\omega_s t+\phi)$$

and $$E_{LO}(x, y, t)=E_{LO}^\circ \sin (\omega_{LO} t+\phi_{LO})$$

The quantities $E_s^\circ$ and $E_{LO}^\circ$ are the amplitudes and $\phi_s$ and $\phi_{LO}$ are the phase angles of the signal waves and the local oscillator waves respectively. Thus the detector signal $i(t)$ will contain components of frequency $\omega_s$, $\omega_{LO}$, $(\omega_s+\omega_{LO})$ and $\Delta\omega$. The first three are too fast for any available detector to follow and are manifested only by an average value of current from the detector. The current which oscillates with a frequency $\Delta\omega$ is then $$i(t, \Delta\omega)=2\eta AE_s^\circ E_{LO}^\circ \cos(\Delta\omega t+\Delta\phi) \langle\sin^2\rangle$$

where $\Delta\phi$ is the difference between $\phi_s$ and $\phi_{LO}$ and $\langle\sin^2\rangle$ is the short term time average of the oscillation at frequency $\omega_s$, too fast for the signal to respond. The value of $\langle\sin^2\rangle$ is ½. The important point is that the signal output oscillates with a frequency $\Delta\omega$ and has an amplitude $$i^\circ=\eta\{AE_{LO}^\circ\}E_s^\circ$$

Since the bracketed terms are constant, the amplitude of the beat frequency output current varies with the amplitude of the signal beam $E_s^\circ$.

The noise in the system is due to the shot nature of the average current produced by the detector. Since the local oscillator term is the dominant value due to the high intensity of the local oscillator beam relative to the signal beam, the average current has a value $$\bar{i}=\eta\iint_A dxdy\{E_{LO}(x,y,t)\}^2$$
$$=\frac{A\eta}{2}(E_{LO}^\circ)^2$$

the mean squared noise *is*

$$i_n^2=2\bar{i}e\Delta f$$

where $e$ is the electron charge and $\Delta f$ is the detector circuit bandwidth. The signal to noise ratio, $\Sigma$, squared is $$\Sigma^2=(i^\circ)^2/i_n^2$$
$$=\eta A(E_s^\circ)^2/e\Delta f$$

It should be noted that the value of the local oscillator strength, $E_{LO}^\circ$, does not appear in the signal to noise ratio $\Sigma$. It should also be noted that it is proportional to the total power in the signal beam. As a consequence, if the beam diameter is changed by a lens arrangement, the value of $E_s^\circ$ would vary inversely as the square root of A, so that $A(E_s^\circ)^2$ would be invariant, and $\Sigma$ would be unchanged. That is the total beam power is unchanged by focusing and the signal to noise ratio is likewise unchanged.

In order to analyze the situation where the two beams, that is the signal beam and the local oscillator beam, are not parallel it is assumed that the plane of the detector is parallel to the local oscillator wave front. The $x$-axis in the detector plane is defined by the line of intersection of the signal wave front which intersects the detector plane at an angle $\theta$ in the $y$ direction. Referenced to the detector plane, the incident waves of wavelength $\lambda$, are $$E_s(x,y,t)=E_s^\circ\sin(\omega_s t+\phi_s(y))$$

and $$E_{LO}(x,y,t)=E_{LO}^\circ\sin(\omega_{LO}t+\phi_{LO}(y))$$

where $$\phi_s(y)=\phi_s+2\pi\theta y/\lambda$$

and $$\phi_{LO}(y)=\phi_{LO}$$

that is, there is no $y$ dependence for the local oscillator phase. A simplification has been made since $\theta$ is very small that $$\tan\theta\simeq\theta$$

The detector current with a frequency $\Delta\omega$ has a strength $$i(t,\Delta\omega)=\eta E_s^\circ E_{LO}^\circ\iint_A dxdy\cos(\Delta\omega t+\Delta\phi(y))$$

where $$\Delta\phi(y)=\phi_s(y)-\phi_{LO}(y)$$
$$=\Delta\phi+2\pi\theta y/\lambda$$

Thus the angle $\theta$ appears critically in the signal output. If the area A is considered for simplicity to be a square with sides $a$, $$A=a^2$$

then $$i(t,\Delta\omega)=\eta E_s^\circ A\cos(\Delta\omega t+\Delta\phi)1/a\int_{-a/2}^{+a/2}dy\cos\frac{(2\pi\theta y)}{\lambda}$$

The $\theta$ dependence is contained in the quantity $$f(\theta)=1/a\int_{-a/2}^{+a/2}dy\cos\frac{(2\pi\theta y)}{\lambda}$$
$$=\frac{\sin\frac{\pi\theta a}{\lambda}}{\frac{\pi\theta a}{\lambda}}$$

In order to maintain a signal to noise ratio that is at least 25 percent of the optimum obtainable, it is necessary that $$|\theta|<\theta_{6db}$$

where $\theta_{6db}$ is defined by $$f(\theta_{6db})=\tfrac{1}{2}$$

It turns out that $\theta_{6db}$ is approximately equal to $0.6\lambda/a$ which means that the angular alignment of the two beams should be better than about $\pm 0.6\lambda/a$. This is the diffraction limit associated with the beam diameter. Thus when plan wave fronts are handled for both beams, the two beams should be closely aligned to obtain a good signal to noise ratio. It should be noted that optical operations on the two beams will not change the signal to noise ratio but will only change the required detector aperture.

It has been found that good signal to noise ratio can be maintained with appreciable angular deviation between the beams when one of the beams is focused on the detector plane and the other is unfocused. When a plane wave is brought to focus by a diffraction limited lens the collected energy is concentrated in a small region of the focal plane known as Airy's disk or the Airy disk. When a perfect lens is uniformly illuminated with monochromatic light, the energy passing through the lens is spread nonuniformly over the entire focal plane. The distribution of energy is a diffraction effect defined by $$\left\{\frac{2J_1\left(\pi\frac{D}{F\lambda^x}\right)}{\pi\frac{D}{F\lambda^x}}\right\}^2$$

where $J_1$ is the Bessel function of the first kind of order one, D is the lens diameter, F the lens focal length and $x$ is the distance from the center of symmetry of the diffraction limited pattern; that is, the point where all of the light would fall if there were no diffraction effect. About 84% of the energy is concentrated in a small area within the first Airy dark ring which is the region where the Bessel function defining intensity first goes to zero. This small area where 84% of the energy falls is Airy's disk. The diameter of this disk is $d_A=2(1.22F\lambda/D)$. In order to obtain a heterodyne signal output from a detector, a system is arranged so that a signal beam is focused on a detector plane and a much stronger local oscillator beam is collimated to cover both the Airy disk of the focused beam and a surrounding region on the focal plane.

When the local oscilaltions and the signal oscillations have parallel wave fronts they will interfere over the region of the Airy disk and give a heterodyne signal. However, unless the detector surface, in the focal plane, is restricted in area to the region of the Airy disk, noise is introduced by all of the local oscillator beam, not just the part that interferes with the signal beam. It might be suggested that both the signal beam and the local oscillator beam be focused so as to reduce the area contributing noise. There is then the problem of superimposing two small Airy disks which is basically the same problem of angular alignment encountered for two unfocused beams. The advantages of this invention are best achieved when one beam is focused and the other beam unfocused, preferably when the signal beam is focused. The unfocused local oscillator beam should cover the entire area over which the focused signal beam can wander.

To keep the noise down to a minimum and hence obtain a maximum signal to noise ratio, the active or effective detector area should match the Airy disk of the focused beam and all other portions of the local oscillator beam except that superimposed on the Airy disk should be excluded from the detector. The analysis of the effect of angular deviation between the two beams corresponds exactly to the previous analysis of angular misalignment. The only difference is that the beam diameter of interest is now small, only $d_A$. The permissible alignment error for the same loss in signal to noise ratio is about $\pm 0.6\lambda/d_A$ which reduces to $\pm 0.6D/F$ for less than 50 percent loss in signal to noise ratio. The ratio of diameter to focal length ($D/F$) of a lens is clearly a large angle, so large, in fact, that the angular alignment requirement is trivial by normal optical standards.

However, the angle requirement can be considered to have been converted to the problem of positioning the effective area of the detector. This becomes the critical factor since the direction that the signal beam enters the focusing system determines the location of the Airy disk on the focal plane. A preferred technique for positioning the effective area of the detector involves an image dissector tube which is used to move the effective area electronically. Even if the location of the Airy disk wanders, indicating a variation in the angle of incidence of the signal beam, the image dissector electronically tracks this motion and compensates for it. Nothing but a mechanical system for manipulating the optical components appears available for aligning the angles of two unfocused beams for ordinary parallel wave front heterodyning or for superimposing the Airy disks of two focused beams.

FIG. 1 illustrates in block diagram form an optical communication system embodying the principles of this invention. As illustrated therein there is provided a signal generator 10 into which information is provided by electrical signals or the like. The output of the signal generator is a collimated beam of coherent light which is modulated in response to the information input to the generator. The signal light beam is transmitted over an arbitrary distance and collected by focusing optics 11. The focusing optics focus the collimated beam of light on a detector surface of a detector 12. Additionally there is provided a local oscillator 13 which provides a second collimated beam of coherent light. Intermediate the focusing optics 11 and detector 12 there is provided an optical mixer 14 which operates to superimpose the collimated local oscillator light beam on the same detector surface as the focused signal beam. The signal beam and the local oscillator beam interfere where superimposed to give a heterodyne signal output from the detector which is in turn processed by a demodulator 15 to provide an information output signal. Additionally a feedback circuit 16 is provided between the detector and the local oscillator for frequency locking of the local oscillator with the signal generator. A detector positioner 17 is provided for moving the effective detector area to detect and track any movement of the Airy disk on the detector 12.

As used herein the term light is intended to include electromagnetic radiation oscillating over a frequency spectrum which includes visible light, ultra violet radiation, infrared radiation, and radiation of wave lengths longer than those usually considered as infrared and known as millimeter waves. The maximum wave length considered is approximately ten millimeters. Thus the term light extends beyond the visible region and includes radiation which is directed by devices commonly considered as optical, such as lenses and mirrors and thus includes those wave lengths shorter than are conveniently directed by conventional wave guides.

Figure 2:
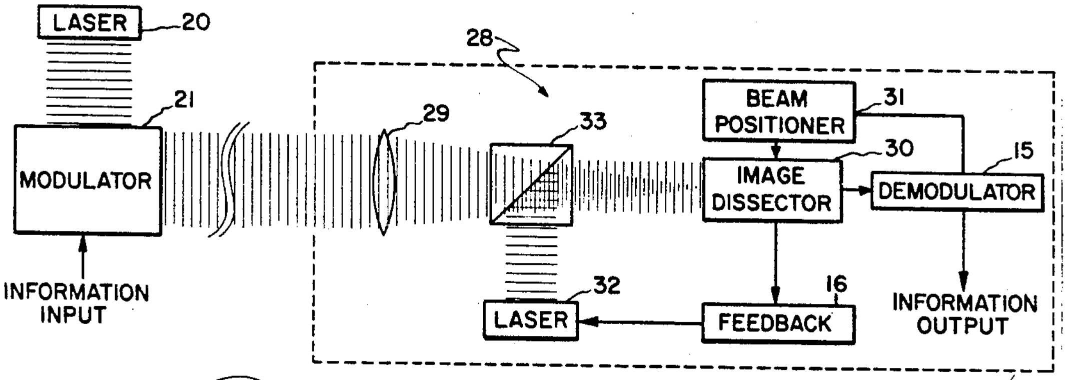
FIG. 2 illustrates a focused heterodyne demodulation system.

In FIG. 2 there is illustrated a preferred embodiment of a focused heterodyne system operating in the portion of the frequency spectrum including ultra violet, visible and near infrared radiation. As illustrated therein there is provided a source of coherent light such as a laser 20 which is employed to provide a carrier wave for information. The laser is preferably a continuous wave device providing a steady collimated beam of coherent monochromatic light. A typical laser useful herein is a helium-neon laser which provides a sharp monochromatic beam of light in the red region of the visible spectrum at a wave length of 6328.17 A. A suitable laser light source is a continuous wave gas laser such as Model 110 manufactured by Perkin-Elmer Spectra-Physics, Inc. For other wave lengths, other coherent light generators can be employed, such as, for example, electronic cavity generators for millimeter waves.

The light beam from the laser 20 is operated upon by a modulator 21 which impresses information upon the light beam. A preferred modulator suitable for impressing information on a light beam is described in U.S. patent application Ser. No. 294,585, now U.S. Patent 3,302,027 entitled "Light Interference Method and Apparatus" by David L. Fried and Wendell S. Read and assigned to North American Aviation, Inc., the assignee of this application. The preferred modulator operates on an interferometric principle to cause amplitude modulation of a light beam, and its operating principles are readily understood by reference to the embodiment illustrated in FIG. 3.

Figure 3:
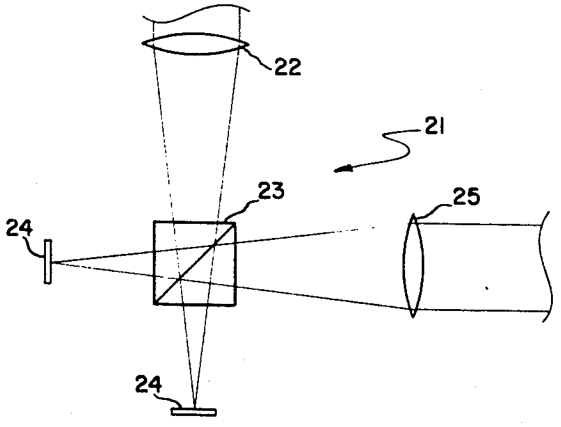
FIG. 3 illustrates a modulator useful in the practice of this invention.

As illustrated in FIG. 3 there is provided a light modulator 21 having an input focusing lens 22 upon which a collimated beam of coherent light is directed. After passing through the input lens 22 the light beam is divided by a beam splitter 23 and the two portions are focused on reflective piezoelectric transducers 24. Light reflected from the piezoelectric transducers is recombined by the beam splitter and passes out of the modulator 21 through an output collimating lens 25. Each of the two piezoelectric transducers 24 is rigidly mounted on one surface thereof remote from the beam splitter and provision is made for applying an electric field across each transducer. The applied electric field causes a mechanical displacement of the surface of the transducer nearer the beam splitter. A reflective coating on this surface reflects the light beam impinging thereon back toward the beam splitter. The two piezoelectric transducers are electrically connected to a source of electrical signals in such a way that the two transducers are driven in opposite phase. Thus, as the electric field varies, one surface of one transducer will move toward the beam splitter and the corresponding surface of the other transducer will move away from the beam splitter. The resulting change in path length on the two legs of the interferometer modulator 21 causes constructive or destructive interference in the recombined light beam because of the phase shift of the light and the amplitude of the output light beam is thereby modulated. The focusing lens 22 and the recollimating lens 25 are provided in the modulator so that a small diameter light beam impinges on the piezoelectric transducers. This permits the use of small size transducers which operate at high frequencies. Although the preferred embodiment of a modulator suitable for use in this invention has been described and illustrated, it will be apparent to one skilled in the art that other optical modulators, such as those employing electro-optic cells, can readily be employed in this invention. It is also contemplated that the signal can be impressed on the signal carrying light beam by modulation of the laser itself. Although an amplitude modulator has been described and illustrated, it will be appreciated that polarization, phase, or frequency modulating devices are also useful in the practice of this invention.

As illustrated in FIG. 2 information applied to the modulator in the form of electrical signals causes a modulation of an output light beam which is transmitted to a focused heterodyne demodulator 28. The light beam from the modulator in a preferred embodiment is readily collimated to the diffraction limit and information can thereby be transmitted over very long distances without great dispersion of the optical beam. The focused demodulator 28 includes a collector lens 29 which is preferably a diffraction limited lens having an appreciable aperture so as to collect a substantial amount of the radiant energy from the signal generator. The size of the required collector lens depends upon the distance from the signal source and the intensity thereof.

In a preferred embodiment the collimated light collected by the collector lens 29 is focused on the detector plane of an image dissector tube 30. It should be noted that because of the large depth of focus available in the optical systems employed, it is not necessary that the image dissector be precisely at the focal plane of the optics. An image dissector is a type of television tube wherein a small portion of the photocathode is viewed by the detector grid and the balance excluded. The area that is viewed is determined by the deflection of a beam of electrons from the photocathode which is guided by a suitable electric field through a small aperture. A typical image dissector tube found useful in the practice of this invention is a type FW-130 manufactured by International Telephone and Telegraph.

An electronic beam positioner 31 is employed for moving the effective detector area by scanning the photocathode of the image dissector tube to locate the spot to be viewed and to cause continued viewing of the selected spot as described hereinafter. The conventional electronic circuits employed with an image dissector tube are sufficient for any of the rates of movement of an image spot encountered in a preferred embodiment.

The image dissector tube also detects the intensity of the image on the active area of the photocathode on the detector plane. The intensity of the image detected by the image dissector tube, and the output of the tube, will vary according to the modulation impressed on the signal carrying light beam. The area of the photocathode illuminated by the local oscillator beam alone has a D.C. output and no signal at the heterodyne frequency and is excluded by the image dissector to minimize noise from this source.

A laser 32 is provided in the illustrated embodiment to serve as a local oscillator. It is preferred that this laser be substantially similar to the signal laser 20 so that a minimum difference in the frequencies of the two light beams is obtained. This difference is preferably equal to the desired beat frequency. The light beam from the local oscillator laser is directed to a conventional cubic beam splitter 33 which is also in the optical path of the signal beam. The beam splitter 33 serves to combine the signal carrying light beam with the light beam from the local oscillator and the two beams are directed on to the detector plane, the light beam from the local oscillator is a collimated beam which illuminates an area on the image dissector tube which is appreciably larger than the Airy disk of the focused beam. The frequency of the output of the local oscillator beam alone is far too high for response by the image dissector tube. The difference in frequency between the signal laser and the local oscillator laser $\Delta\omega$ is slow enough for the image dissector to respond. Thus a heterodyne response at the difference frequency is obtained in the relatively small region of the Airy disk and no signal is obtained in other regions of the image dissector photocathode. A steady D.C. output is obtained where the local oscillator beam alone impinges on the detector. The electronic beam positioner circuit 31 scans the image dissector tube until the modulated Airy disk is located and continues to monitor the intensity of the signal from this effective area of the photocathode. Since the effective detector area is of the same order of size as the Airy disk, the D.C. signal from the local oscillator is excluded from the system thereby excluding this source of noise.

The output of the image dissector tube is directed to a conventional communications frequency demodulator 15 which extracts the modulated heterodyne signal from the image dissector tube and presents the information thereon in usable form. Thus, for example, a television picture can be obtained and applied as an information input to the modulator 21 by means of electrical signals applied across the piezoelectric transducers 24. This causes a modulation of the signal carrying light beam. After transversing an arbitrary distance the modulated beam is focused by the collector lens 29 on the face of the image dissector tube. Likewise a collimated local oscillator light beam is provided by a laser 32 and directed on the detector surface of the image dissector tube by means of a beam splitter 33. The heterodyne signal between the focused signal carrying beam and the collimated or unfocused local oscillator beam is detected by the image dissector tube. The output of the image dissector tube is demodulated by the demodulator 15 to produce electrical signals as an information output which can, for example, be applied to a conventional television receiver to produce a clear television picture.

Also illustrated in FIG. 2 is a feedback arrangement 16 between the detector and the local oscillator laser. This feedback can also be between the demodulator and the local oscillator. The continuous wave gas lasers preferably employed in the practice of this invention have a small frequency drift due to thermal gradients and the like. Frequency locking between the two sources of coherent light is desirable to maintain the beam heterodyne frequency below some selected value. Frequency locking is accomplished by monitoring the heterodyne frequency and adjusting the frequency of the local oscillator to provide a desired relation therebetween. The frequency of the local oscillator laser is adjusted over narrow ranges by varying the cavity size in a gas laser such as, for example, by supporting one of the laser mirrors on a piezoelectric disk or by mechanically deforming the laser cavity with a magnetostrictive support. By this technique frequency locking between the local oscillator laser and the signal laser has been accomplished to frequency mismatches of substantially less than 100 kilocycles. It is also recognized that frequency control of solid lasers can be accomplished by means of an electronically controlled magnetic field thereon.

In the system described and illustrated in FIG. 2 it is sometimes found that the required focal length of the collector lens 29 is inconveniently long to provide both a fast optical system and a compact heterodyne demodulator package. With a fast, long focal length collector lens the diameter of the Airy disk may also be smaller than the effective aperture of the detector so that excess light from the local oscillator is collected and an increase in noise is obtained. The optimum system has an Airy disk of the same size as the effective aperture of the detector for maximum signal to noise ratio. A preferred technique for handling a small diameter Airy disk is to re-image with magnification the collector focal plane onto a second focal plane. This allows significant increase in the Airy disk diameter. The re-imaging or focusing lens should be a diffraction limited lens. Since the focusing lens is quite small in diameter, angular resolution is almost trivial. That is, in a particular imaging configuration the focusing lens must be able to resolve the Airy disk formed by the collector lens, and must be fast enough to collect all the light.

Figure 4:
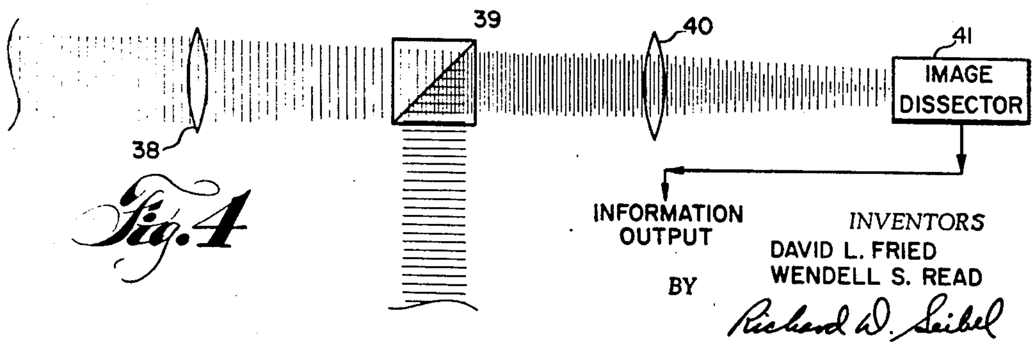
FIG. 4 illustrates a portion of a focused heterodyne demodulator having a reimaging lens.

Thus as illustrated in FIG. 4 there is provided in a focused heterodyne detector a collector lens 38 upon which a collimated light beam impinges. The collector lens 38 causes the collimated light beam to become convergent but in order to have a fast lens a focal length is provided which is longer than the detector apparatus. After passing through a beam splitter 39 the light beam from the collector lens passes through a focusing lens 40. The focusing lens focuses the converging light beam on the detector plane of an image dissector tube 41 as in the previously described embodiment. Likewise a collimated light beam from a local oscillator is combined with the converging light beam by the beam splitter 39. The collimated light beam is caused to converge by the focusing lens 40 but because of the angular difference between the converging light beam from the collector lens and the collimated light beam, the focal plane of the local oscillator light beam is substantially beyond the focal plane of the signal beam and substantially beyond the detector plane of the image dissector tube. Thus the signal carrying beam is focused on the image dissector tube as an Airy disk and the local oscillator beam, although not strictly parallel, is unfocused on the face of the image dissector tube and illuminates an area appreciably larger than the Airy disk of the signal beam. The term unfocused includes the slightly converging beam of this embodiment as well as the collimated beam of other illustrated embodiments. The focusing lens 40 has the effect of converting the plane wave of the local oscillator beam into a spherical wave. However, so long as the curvature of the local oscillator wave front over the signal Airy disk is such that the distance between a plane and the curved wave front is small compared to a wave length of light the effect on detector operation is negligible. So long as the focusing lens 40 has a focal length of many wave lengths, then the curvature of the wave front is very small and there is no problem. Obviously, this condition is easy to satisfy; in fact, it is almost impossible to avoid satisfying it. This can also be stated as requiring that the angular spread of the local oscillator beam is very small compared to $\lambda/d_A$ which is equal to the reciprocal of the $f$ number of the lens.

Figure 5:
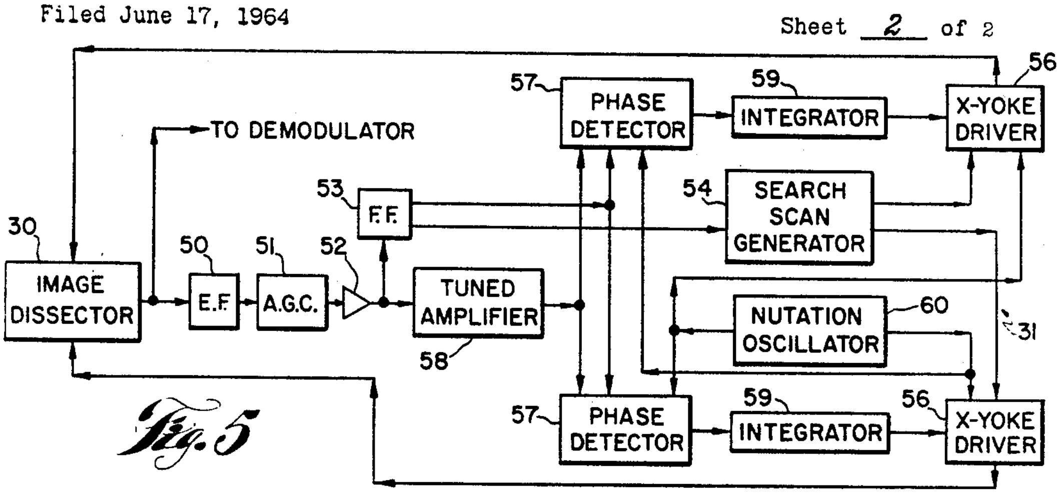
FIG. 5 illustrates a beam positioner for an image dissector tube.

In FIG. 5 there is illustrated an electronic beam positioner 31 which is useful for controlling the image dissector tube 30 in the preferred embodiment. There is provided in this embodiment an emitter follower 50 and automatic gain control 51 for coupling the output of the image dissector tube to an amplifier 52. The amplifier output is connected to a flip-flop 53 so that the system can be operated in either a search mode or a tracking mode. The first operation of the image dissector tube 30 and the beam positioner 31 is to locate the Airy disk, that is, the region of the detector surface that is effective and has a heterodyne signal thereon. In order to accomplish this the system is operated in a search mode. In the performance of this function the flip-flop 53, manually switched to one state, actuates a search scan generator 54 which generates sawtooth deflection signals that provide a conventional television-type scanning raster. The deflection signals are amplified by $x$ and $y$ yoke drivers 56 and applied to the image dissector tube 30 to deflect the electron beam thereof in a television-type raster covering the face of the tube.

When the electron beam in the search scan mode encounters the Airy disk on the face of the image dissector tube, an output signal of heterodyne frequency is obtained which switches the flip-flop 53 to its other state and places the electron beam positioner in the track mode. In the track mode, search generator 54 is disabled and the flip-flop enables the phase detectors 57 which are disabled in the search mode. The output of the amplifier 52 is coupled to two conventional phase detectors 57 by a 10 kc tuned amplifier 58. The two phase detectors 57 are for the $x$ and $y$ axes respectively of the image dissector tube and are coupled to the $x$ and $y$ yoke driver amplifiers 56 by integrators 59. In order to maintain a tracking function a nutation oscillator 60 is coupled to the $x$ and $y$ yoke drivers 56 and the phase detectors 57. This nutation oscillator produces three output functions sin $\alpha t$, cos $\alpha t$ and —cos $\alpha t$. The sin $\alpha t$ output is connected to one of the phase detectors and one of the yoke drivers. The cos $\alpha t$ function is connected to the other yoke driver and the —cos $\alpha t$ output is connected to the second phase detector.

The sin $\alpha t$ and cos $\alpha t$ functions applied to the yoke drivers generate a small diameter circular scan of the electron beam in the image dissector tube about an $x—y$ position to the Airy disk as found in the search mode. The diameter of the circle generated is of the same order of magnitude as the diameter of the Airy disk. When the nutating scan is superimposed on the Airy disk a constant amplitude signal is generated and amplified by the tuned amplifier 58 and no shift occurs in the $x$ and $y$ positions of the electron beam. As the Airy disk drifts relative to the nutation circle on the image dissector due to mechanical vibration of various devices, atmospheric turbulence, or pointing errors, a varying magnitude signal is obtained during the nutation of the electron beam. The phase of the varying signal is detected in the phase detectors 57, the output of which is accumulated in the integrators 59 to cause a shift in the center of the nutating beam position for tracking the Airy disk. By this means any drift in the Airy disk position is followed by the electron beam deflection and a continuous output signal from the image dissector is available for demodulation. It has been found that an operating frequency of 10 kc. on the nutation oscillator is sufficient to avoid any difficulties from random variations in Airy disk position. It has also been found sufficient to manually reset the system from the tracking mode to the search mode in the event the Airy disk is lost in the tracking mode.

Just as one can use lenses to collect and focus light beams, it is clear that mirrors can be used in a similar manner. Front surface reflective devices are particularly useful for longer wave lengths of light where solid materials have limited transmission and for large aperture collectors at any wave length. Thus FIG. 6 illustrates a portion of focused heterodyne system employing mirrors to focus the signal light beam.

A parabolic collector mirror 45 is employed to collect and focus a signal carrying beam of parallel coherent light. The focused light beam is directed onto a plane mirror 46 which is mounted at an angle to the axis of the parabolic mirror 45 so as to direct the focused beam off to one side and onto the face of a mosaic of photodetectors 47 arranged beside the path of the incident light beam. The photodetectors 47 are located so that the focal plane of the collector mirror lies on the active face of the photodetectors. The plane mirror 46 has an aperture 48 through which a local oscillator beam of parallel light 43 is directed to the face of the photodetectors so that the focused light beam and the unfocused light beam are superimposed. In this embodiment as in the others described and illustrated herein, no problems of angular alignment are encountered. As above described, auxiliary lenses or mirrors can be employed to vary the focal length of the system or the diameter of the Airy disk. Similarly the local oscillator beam can be provided through an aperture in the focusing mirror 45 and reflected to the photodetectors by a plane mirror 46 without an aperture.

Figure 6:
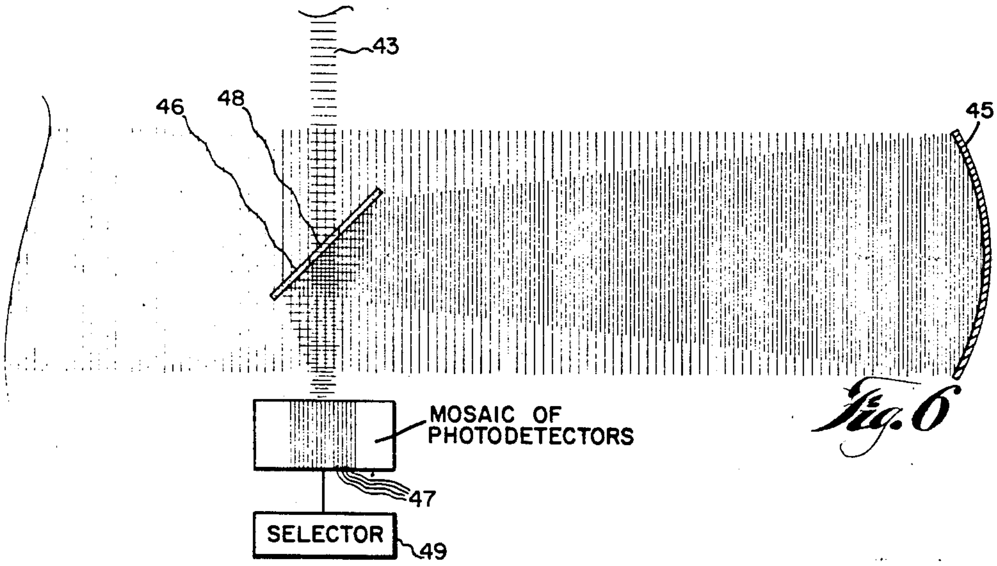
FIG. 6 illustrates a portion of a mirror embodiment of a focused heterodyne demodulator.

The embodiment of FIG. 6 illustrates the use of a mosaic of photodetectors in the focal plane of the focusing optics rather than an image dissector tube. A detector of this type requires no movement of parts or deflection of electron beams to move the effective detector area. Instead a simple selector 49 is employed to select the photodetector signal having the heterodyne frequency and reject the signals from all other photodetectors in the mosaic. This operation can be performed manually or with conventional selector logic switching. The photodetectors employed in the mosaic are conventional devices of small size so that a small Airy disk covers most of the face of an individual sensor element. Lead sulfide detectors, bolometers, thermisters or other radiation sensitive devices are suitable for the purpose.

It will also be apparent to one skilled in the art that a single photomultiplier tube or the like can be employed in the practice of this invention and a mechanically movable aperture be provided in front of the photomultiplier. A conventional servomechanical system is employed to position the aperture which lies in the focal plane of the optical system. When the aperture is the same diameter as the Airy disk, the exact distance between the aperture and the photomultiplier is of no significance as the two light beams incident thereon are now diverging at the same angle due to diffraction at the small aperture.

Although specific items are shown in the illustrated embodiments for many of the system components, it will be apparent that substitutions can be made in many instances. Thus, for example, the optical mixer can be a flat plate beam splitter rather than the cube described or the detector can be impurity doped semiconductors for long wave lengths or other square law radiation sensitive devices can be used.

Obviously many other modifications and variations of the present invention are possible in light of the above teachings. It is therefore to be understood that within the scope of the appended claims, the invention may be practiced otherwise than as specifically described.

What is claimed is:

1. A heterodyne detector comprising:

means for focusing a beam of coherent light of a first frequency into an Airy disk at a focal plane;

means for impinging an unfocused beam of coherent light of a second frequency on the focal plane; and means at the focal plane for detecting a heterodyne frequency between the focused beam of light and the unfocused beam of light, including means for excluding a portion of the unfocused beam of light from said means for detecting.

2. A heterodyne detector as defined in claim 1 wherein:

said means for focusing comprises a diffraction limited collecting lens; and wherein:

said means for impinging an unfocused beam of coherent light further comprises:

a local oscillator laser light source; and a beam splitter between said collecting lens and said means for detecting for directing the unfocused beam of coherent light to said means for detecting.

3. A heterodyne detector as defined in claim 2 wherein said means for detecting further comprises an image dissector tube and a demodulator.

4. A heterodyne detector as defined in claim 2 wherein said means for focusing further comprises a diffraction limited focusing lens between said collecting lens and said means for detecting.

5. A heterodyne detector as defined in claim 1 wherein said means for focusing comprises a diffraction limited mirror.

6. A heterodyne detector as defined in claim 5 wherein said means for impinging an unfocused beam of coherent light further comprises:

a local oscillator laser light source; and a beam splitter in the optical path of both the focused and unfocused light beams for directing the light beams to the means for detecting.

7. A heterodyne detector as defined in claim 5 wherein said means for focusing further comprises a diffraction limited focusing lens between said collecting mirror and said means for detecting.

8. a heterodyne detector as defined in claim 5 wherein said means for detecting further comprises an image dissector tube and a demodulator.

9. A heterodyne detector comprising:

means for focusing a beam of coherent light of a first frequency into an Airy disk on a focal plane;

means for impinging an unfocused beam of coherent light of a second frequency on the focal plane;

means at the focal plane for detecting a heterodyne frequency between the focused beam of light and the unfocused beam of light, said detecting means having an effective area substantially equal to the area of said Airy disk; and means for causing relative motion of the effective area and the Airy disk in a sense to superpose the Airy disk on the effective area.

10. A communications apparatus comprising:

means for transmitting a modulated beam of coherent light of a first frequency;

means for focusing the modulated beam of light;

means for superimposing an unfocused beam of coherent light of a second frequency on the focal plane of the modulated beam of light;

means for selectively sensing the region of superposition of the light beams; and means for obtaining information from the beat frequency of the light beams whereby good signal-to-noise ratio is maintained with minimized accuracy of angular alignment.

11. A communications apparatus comprising:

means for generating a first beam of coherent light of a first frequency;

means for modulating the first beam of light;

means for focusing the first beam of light on a focal plane;

local oscillator means for generating a second beam of coherent light of a second frequency;

means for directing the second beam of light unfocused on the focal plane of the first beam;

means for sensing a heterodyne frequency between the first and second beams of light;

means for excluding a portion of the unfocused light from the means for sensing; and means for obtaining information from the heterodyne frequency.

12. An optical receiver comprising:

an optical to electrical transducer having a sensitive surface positioned substantially on a focal plane;

collecting means for receiving a coherent optical radiation signal and focusing such signal into an Airy disk at the focal plane;

a local optical oscillator;

means for directing the output of said local oscillator unfocused upon an area encompassing the Airy disk;

said sensitive surface having an effective area substantially equal to the area of the Airy disk;

means for moving the effective area to effect substantial coincidence thereof with the area of the Airy disk; and output means connected with the transducer whereby good signal-to-noise ratio is maintained with minimized accuracy of angular alignment.

13. A communications apparatus comprising:

a first laser for producing a parallel beam of coherent light of a first frequency;

a modulator for impressing information on the light beam from said first laser and for projecting the light beam;

a collector lens in the light beam projected from the modulator for focusing the light beam into an Airy disk on a focal plane;

an image dissector tube having a photocathode on said focal plane;

a second laser for producing a parallel beam of coherent light of a second frequency;

a beam splitter between said collector lens and said image dissector and also in the path of the beam of light from said second laser for mixing the focused light beam from said collector lens and the parallel light beam from said second laser;

means for positioning an electron beam in said image dissector for sensing a beat frequency between said first frequency and said second frequency;

a demodulator for obtaining information from the beat frequency sensed by said image dissector tube; and feedback between said demodulator and said second laser for adjusting the frequency of said second laser in response to the frequency of said first laser whereby good signal-to-noise ratio is maintained with minimized accuracy of angular alignment.

14. An apparatus as defined in claim 13 further comprising a focusing lens between said beam splitter and said image dissector for changing the focal length of the apparatus.

15. An apparatus as defined in claim 13 wherein said means for positioning an electron beam in said image dissector further comprises:

means for deflecting the electron beam;

scanning means connected to said means for deflecting for effecting scanning of the electron beam;

nutation means connected to said means for deflecting for nutating the electron beam;

means for selectively switching from said scanning means to said nutation means; and means responsive to intensity of the electron beam for shifting the center of nutation of the electron beam in a sense to cause the beam to track said Airy disk.

16. A heterodyne detector as defined in claim 2 wherein said means for detecting comprises an array of a plurality of photodetectors; and means for selecting the photodetector having a heterodyne frequency and rejecting signals from other photodetectors in the array.

17. A method for heterodyne detection of light comprising:

focusing a beam of coherent light of a first frequency into an Airy disk at a focal plane;

impinging an unfocused beam of coherent light of a second frequency on the focal plane; and detecting a heterodyne frequency between the focused beam of light and only a portion of the unfocused beam of light.

18. A method for heterodyne detection comprising:

focusing a beam of coherent light of a first frequency into an Airy disk at a focal plane by means of a diffraction limited collecting lens;

generating an unfocused beam of coherent light of a second frequency in a local oscillator laser light source;

optically combining the unfocused beam and the focused beam and directing the combined beam toward the focal plane; and detecting a heterodyne frequency between the focused beam of light and only a portion of the unfocused beam of light.

19. A method for heterodyne detection comprising:

focusing beam of coherent light of a first frequency into an Airy disk on a focal plane;

impinging an unfocused beam of coherent light of a second frequency on a focal plane;

detecting a heterodyne frequency between the focused beam of light and the unfocused beam of light with a photodetector having an effective area substantially equal to the area of said Airy disk; and causing relative motion of the photodetector effective area and the Airy disk in a sense to superpose the Airy disk on the effective area.

20. A method for communication comprising transmitting a modulated beam of coherent light of a first frequency;

focusing the modulated beam of light;

superimposing an unfocused beam of coherent light of a second frequency on the focal plane of the modulated beam of light;

selectively sensing the region of superposition of the light beams; and obtaining information from the beat frequency of the light beams in the sensed region.

21. A method for communication comprising:

generating a first beam of coherent light of a first frequency;

modulating the first beam of light;

focusing the first beam of light on a focal plane;

generating a second beam of local oscillator coherent light of a second frequency;

directing the second beam of light unfocused on the focal plane of the first beam;

excluding a portion of the unfocused light from a means for sensing light;

sensing a heterodyne frequency between the first and the second beams of light; and obtaining information from the heterodyne frequency.

22. A method of heterodyne detection comprising:

impinging an unfocused light beam of a first frequency upon a plane;

focusing and impinging upon said plane a light beam of a second frequency, and detecting light energy at said focused plane over an area not substantially greater than the area of impingement of said second beam on said plane.

References Cited

UNITED STATES PATENTS

| | | | |
|---|---|---|---|
| 2,967,247 | 1/1961 | Turck | 250—203 |
| 3,083,299 | 3/1963 | Cruse | 250—199 |
| 3,149,235 | 9/1964 | Clark | 250—203 |
| 3,170,122 | 2/1965 | Bennett | 250—199 |
| 3,215,840 | 11/1965 | Buhrer | 250—199 |
| 3,218,390 | 11/1965 | Bramley | 250—199 |
| 3,229,095 | 1/1966 | Lasher et al. | 250—199 |
| 3,231,741 | 1/1966 | Siegman | 250—199 |
| 3,240,942 | 3/1966 | Birnbaum et al. | 250—203 |

OTHER REFERENCES

Dulberger et al.: Electronics, Nov. 3, 1961, pp. 40–44.

Forrester et al.: Phys. Rev., vol. 99, No. 6, Sept. 15, 1955, pp. 1691–1700.

Forrester: Jour, Opt. Soc. Amer., vol. 51, No. 3, March 1961, pp. 253–259.

Strong: Concepts of Classical Optics, Freeman Co., 1958, pp. 201–207.

ROBERT L. GRIFFIN, *Primary Examiner.*

A. MAYER, *Assistant Examiner.*